US006980042B2

(12) United States Patent
LaBerge (10) Patent No.: US 6,980,042 B2
(45) Date of Patent: Dec. 27, 2005

(54) DELAY LINE SYNCHRONIZER APPARATUS AND METHOD

(75) Inventor: Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/819,366

(22) Filed: Apr. 5, 2004

(65) Prior Publication Data

US 2005/0218956 A1  Oct. 6, 2005

(51) Int. Cl.[7] .............................. G06F 1/04; H03K 3/00
(52) U.S. Cl. ...................... 327/291; 327/141; 327/160; 327/163
(58) Field of Search ................................. 327/141, 160, 327/161, 162, 163, 291, 293, 294, 295, 297, 327/299

(56) References Cited

U.S. PATENT DOCUMENTS

| | | | |
|---|---|---|---|
| 3,742,253 A | 6/1973 | Kronies | 307/247 |
| 4,045,781 A | 8/1977 | Levy et al. | 364/200 |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,608,702 A * | 8/1986 | Hirzel et al. | 375/360 |
| 4,707,823 A | 11/1987 | Holdren et al. | 370/1 |
| 4,724,520 A | 2/1988 | Athanas et al. | 364/200 |
| 4,831,520 A | 5/1989 | Rubinfeld et al. | 364/200 |
| 4,891,808 A * | 1/1990 | Williams | 370/503 |
| 4,930,128 A | 5/1990 | Suzuki et al. | 371/12 |
| 4,953,930 A | 9/1990 | Ramsey et al. | 350/96.11 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |
| 5,313,590 A | 5/1994 | Taylor | 395/325 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 395/575 |
| 5,355,391 A | 10/1994 | Horowitz et al. | 375/36 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,566,325 A | 10/1996 | Bruce, II et al. | 395/494 |
| 5,577,220 A | 11/1996 | Combs et al. | 395/416 |

(Continued)

FOREIGN PATENT DOCUMENTS

EP  0849685 A2  6/1998

(Continued)

OTHER PUBLICATIONS

Intel, "Flash Memory PCI Add-In Card for Embedded Systems", Application Note AP-758, Sep., 1997, pp. i-13.

(Continued)

Primary Examiner—Kenneth B. Wells
Assistant Examiner—Khareem E. Almo
(74) Attorney, Agent, or Firm—Dorsey & Whitney LLP (57) ABSTRACT

A synchronizer system and method that can be used with a conventional adjustable delay circuit to preserve a pseudo-synchronous phase relationship between clock signals of different clock domains when the time delay of the adjustable delay circuit from which one of the clock signals is output is changed.

55 Claims, 5 Drawing Sheets

U.S. PATENT DOCUMENTS

| | | | |
|---|---|---|---|
| 5,581,767 A | 12/1996 | Katsuki et al. | 395/800 |
| 5,606,717 A | 2/1997 | Farmwald et al. | 395/856 |
| 5,638,334 A | 6/1997 | Farmwald et al. | 365/230.03 |
| 5,638,534 A | 6/1997 | Mote, Jr. | 395/485 |
| 5,659,798 A | 8/1997 | Blumrich et al. | 395/846 |
| 5,687,325 A | 11/1997 | Chang | 395/284 |
| 5,706,224 A | 1/1998 | Srinivasan et al. | 365/49 |
| 5,710,733 A | 1/1998 | Chengson et al. | 365/52 |
| 5,715,456 A | 2/1998 | Bennett et al. | 395/652 |
| 5,729,709 A | 3/1998 | Harness | 395/405 |
| 5,748,616 A * | 5/1998 | Riley | 370/242 |
| 5,796,413 A | 8/1998 | Shipp et al. | 345/522 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,887,159 A | 3/1999 | Burrows | 395/567 |
| 5,928,343 A | 7/1999 | Farmwald et al. | 710/104 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,023,726 A | 2/2000 | Saksena | 709/219 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,038,630 A | 3/2000 | Foster et al. | 710/132 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,067,649 A | 5/2000 | Goodwin | 714/718 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,092,158 A | 7/2000 | Harriman et al. | 711/151 |
| 6,098,158 A | 8/2000 | Lay et al. | 711/162 |
| 6,105,075 A | 8/2000 | Ghaffari | 710/5 |
| 6,125,431 A | 9/2000 | Kobayashi | 711/154 |
| 6,128,703 A | 10/2000 | Bourekas et al. | 711/138 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 * | 3/2001 | Fisch et al. | 327/141 |
| 6,219,725 B1 | 4/2001 | Diehl et al. | 710/26 |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/201 |
| 6,256,692 B1 | 7/2001 | Yoda et al. | 710/104 |
| 6,272,609 B1 | 8/2001 | Jeddeloh | 711/169 |
| 6,285,349 B1 | 9/2001 | Smith | 345/147 |
| 6,286,083 B1 | 9/2001 | Chin et al. | 711/151 |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,367,074 B1 | 4/2002 | Bates et al. | 717/11 |
| 6,370,068 B2 | 4/2002 | Rhee | 365/196 |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,433,785 B1 | 8/2002 | Garcia et al. | 345/531 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,462,978 B2 | 10/2002 | Shibata et al. | 365/63 |
| 6,463,059 B1 | 10/2002 | Movshovich et al. | 370/389 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B2 | 11/2002 | Kawata et al. | 438/109 |
| 6,487,556 B1 | 11/2002 | Downs et al. | 707/101 |
| 6,490,188 B2 | 12/2002 | Nuxoll et al. | 365/63 |
| 6,493,803 B1 | 12/2002 | Pham et al. | 711/147 |
| 6,496,193 B1 | 12/2002 | Surti et al. | 345/552 |
| 6,496,909 B1 | 12/2002 | Schimmel | 711/163 |
| 6,501,471 B1 | 12/2002 | Venkataraman et al. | 345/424 |
| 6,505,287 B2 | 1/2003 | Uematsu | 711/170 |
| 6,523,092 B1 | 2/2003 | Fanning | 711/134 |
| 6,523,093 B1 | 2/2003 | Bogin et al. | 711/137 |
| 6,526,483 B1 | 2/2003 | Cho et al. | 711/154 |
| 6,539,490 B1 | 3/2003 | Forbes et al. | 713/401 |
| 6,552,564 B1 | 4/2003 | Forbes et al. | 326/30 |
| 6,564,329 B1 | 5/2003 | Cheung et al. | 713/322 |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |
| 6,615,325 B2 | 9/2003 | Mailloux et al. | 711/154 |
| 6,622,227 B2 | 9/2003 | Zumkehr et al. | 711/167 |
| 6,628,294 B1 | 9/2003 | Sadowsky et al. | 345/568 |
| 6,629,220 B1 | 9/2003 | Dyer | 711/158 |
| 6,631,440 B2 | 10/2003 | Jenne et al. | 711/105 |
| 6,636,110 B1 | 10/2003 | Ooishi et al. | 327/565 |
| 6,646,929 B1 | 11/2003 | Moss et al. | 365/194 |
| 6,658,509 B1 | 12/2003 | Bonella et al. | 710/100 |
| 6,662,304 B2 | 12/2003 | Keeth et al. | 713/400 |
| 6,665,202 B2 | 12/2003 | Lindahl et al. | 365/49 |
| 6,667,895 B2 | 12/2003 | Jang et al. | 365/63 |
| 6,681,292 B2 | 1/2004 | Creta et al. | 711/119 |
| 6,697,926 B2 | 2/2004 | Johnson et al. | 711/167 |
| 6,715,018 B2 | 3/2004 | Farnworth et al. | 710/300 |
| 6,718,440 B2 | 4/2004 | Maiyuran et al. | 711/137 |
| 6,721,195 B2 | 4/2004 | Brunelle et al. | 365/63 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,745,275 B2 | 6/2004 | Chang | 710/305 |
| 6,751,703 B2 | 6/2004 | Chilton | 711/113 |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |

| | | | |
|---|---|---|---|
| 6,771,538 B2 | 8/2004 | Shukuri et al. | 365/185.05 |
| 6,775,747 B2 | 8/2004 | Venkatraman | 711/137 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,811,320 B1 | 11/2004 | Abbott | 385/58 |
| 6,816,947 B1 | 11/2004 | Huffman | 711/151 |
| 6,820,181 B2 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,845,409 B1 | 1/2005 | Talagala et al. | 710/20 |
| 6,889,304 B2 | 5/2005 | Perego et al. | 711/170 |
| 6,910,109 B2 | 6/2005 | Holman et al. | 711/156 |
| 2001/0039612 A1 | 11/2001 | Lee | 713/2 |
| 2002/0112119 A1 | 8/2002 | Halbert et al. | 711/115 |
| 2002/0116588 A1 | 8/2002 | Beckert et al. | |
| 2002/0144064 A1 | 10/2002 | Fanning | 711/144 |
| 2002/0178319 A1 | 11/2002 | Sanchez-Olea | 710/305 |
| 2003/0005223 A1 | 1/2003 | Coulson et al. | 711/118 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0149809 A1 | 8/2003 | Jensen et al. | 710/22 |
| 2003/0163649 A1 | 8/2003 | Kapur et al. | 711/146 |
| 2003/0177320 A1 | 9/2003 | Sah et al. | 711/158 |
| 2003/0191913 A1 | 10/2003 | Holman et al | 711/156 |
| 2003/0193927 A1 | 10/2003 | Hronik | 370/351 |
| 2003/0217223 A1 | 11/2003 | Nino et al. | 711/105 |
| 2003/0229762 A1 | 12/2003 | Maiyuran et al. | 711/137 |
| 2003/0229770 A1 | 12/2003 | Jeddeloh | 711/213 |
| 2004/0022094 A1 | 2/2004 | Radhakrishnan et al. | 365/200 |
| 2004/0064602 A1 | 4/2004 | George | 710/22 |
| 2004/0126115 A1 | 7/2004 | Levy et al. | 398/116 |
| 2004/0144994 A1 | 7/2004 | Lee et al. | 257/200 |
| 2004/0236885 A1 | 11/2004 | Fredriksson et al. | 710/100 |
| 2005/0044327 A1 | 2/2005 | Howard et al. | 711/147 |
| 2005/0071542 A1 | 3/2005 | Weber et al. | 711/105 |

FOREIGN PATENT DOCUMENTS

| | | |
|---|---|---|
| JP | 2001265539 A | 9/2001 |
| WO | WO 93/19422 | 9/1993 |
| WO | WO 02/27499 A2 | 4/2002 |

OTHER PUBLICATIONS

Shanley, T. et al., "PCI System Architecture", Third Edition, Mindshare, Inc., 1995, pp. 24-25.

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Intel, "Intel 840 Chipset: 82840 Memory Controller Hub (MCH)", Datasheet, Oct. 1999, pp. 1-178.

Micron Technology, Inc., "Synchronous DRAM Modue 512MB/1GB (x72, ECC) 168-PIN Registered FBGA SDRAM DIMM", Micron Technology, Inc., 2002, pp. 1-23.

* cited by examiner

DELAY LINE SYNCHRONIZER APPARATUS AND METHOD

TECHNICAL FIELD

This invention relates generally to generating clock signals, and more specifically, to a synchronizing circuit that can be used for maintaining a pseudo-synchronous phase relationship for clock signals of different time domains.

BACKGROUND OF THE INVENTION

Internal clock signals for a memory device are typically derived from a core system clock. The core system clock signal generally has a lower frequency than is desirable for internal clock signals, and consequently, higher frequency clock signals are generated from the core system signal for use as internal clock signals. The higher frequency clock signals generally have a frequency that is a multiple of the frequency of the core clock signal. For example, it is not unusual for internal clock signals to have a clock frequency that is two, three, or four times the core clock signal frequency. Techniques for generating clock signals having higher frequencies from the core clock signal are well known. Generally, it can be described that the core system clock is in a first clock domain and the internal clock signals having a common higher clock frequency are in a second clock domain, and similarly, internal clock signals having the same, but even higher clock frequency, are yet in a third clock domain. In some instances, different devices are operating in different clock domains, but operation needs to be synchronized. For example, a memory device may be operating in a higher frequency clock domain, but a memory controller communicating with the memory device may be operating in a lower frequency clock domain. However, successful operation of the memory device and memory controller depend on the signals transmitted between the two meeting established timing relationships.

Typically, the higher frequency clock signals that are generated from the core clock signal have a fixed phase relationship with the core clock signal. For example, as shown in FIG. 1, an internal clock signal 108 having twice the clock frequency of a core clock signal 104 has rising edges that are coincident, or synchronized, with each clock edge of the core clock signal. Thus, at time T0 and T1, clock transitions of the core clock signal and the internal clock signal 108 are coincident. Similarly, an internal clock signal 112 having four times the clock frequency of the core clock signal 104 has a different, but also fixed, phase relationship with the core clock signal. More specifically, the rising edge of every other clock pulse of the internal clock signal 112 is synchronized with every clock transition of the core clock signal 104. As shown in FIG. 1, the core clock signal 104 and the internal clock signal 112 have clock transitions that are coincident at the times T0 and T1.

It is often desirable to adjust the phase relationship of an internal clock signal with respect to the core clock signal from which internal clock signal is generated. Adjusting the phase relationship provides the ability to accommodate inherent time delays that alter the expected phase relationship. For example, phase shifts can result from line loading issues, varying line impedances, and propagation delays. Another example is different lengths of different conductive signal paths will cause different time delays. Thus, two synchronized clock signals on two different length signal paths will have two different time delays, and consequently, arrive at their respective destinations at different times. Where an operation relies on the synchronization of the two clock signals, clearly this situation is undesirable.

Additionally, delay circuits can also be used to alter the relative timing of signals to modify various timing margins of signals. That is, signals that are internal to a memory device, as well as signals that are provided externally of the memory device, can have the timing adjusted with respect to the timing of other signals in order to provide greater or lesser timing margins, but still remain within published timing specifications. For example, where a memory controller is coupled to a memory device, and a write operation is to be requested, the relative timing of a write data strobe with respect to the transmission of data can be modified through the use of delay circuits in order to shift the time relationship at which the write data strobe is provided to the memory device by the memory controller and when the data is actually provided by the memory controller to the memory device. Having the flexibility to change the relative timing of internal and external signals, including external signals that are provided between different devices, is often desirable in order to accommodate process and device variations that result in performance variations.

The relative phase of a clock signal can be adjusted by adding a delay into the signal path of the clock signal. The added time delay to a clock signal causes the clock signal to shift in time, thus, resulting in the phase of the delayed clock signal shifting. A time delay can be selected such that a clock signal that would otherwise become unsynchronized because of the inherent time delays is further delayed so that the clock signal can again be synchronized. An adjustable delay circuit provides the flexibility of adjusting the time delay added to the clock signal. With many conventional delay circuits, the time delay is adjusted by changing a value applied to the delay circuit that is indicative of the amount of time delay desired. Such adjustable delay line circuits are well known in the art.

A problem related to conventional delay circuits is that glitch or runt pulses are often output from the delay circuit in response to changing the time delay. In some cases, the particular design of the delay circuit is inherently susceptible to generating glitch pulses when the time delay is changed. Factors such as the timing of an input clock signal relative to when a delay circuit is disabled in order to change the time delay or switching noise also contribute to the generation of glitch pulses. The problem results from the possibility that the glitch pulses may inadvertently trigger a response by a circuit coupled to the output of the delay circuit. Thus, when changing the time delay of a delay circuit, an errant pulse may cause unexpected results.

Another problem with using conventional delay lines arises with respect to maintaining a phase relationship between a first clock signal and a second, higher frequency clock signal, when adjusting the time delay of a delay line circuit used in delaying the second clock signal. In the process of adjusting the time delay of the delay circuit, the phase relationship of the second clock signal relative to the first clock signal may be lost. More specifically, a circuit that performs a function in response to the second clock signal, that results in performing the function generally coincident with a clock transition of the first clock signal, can end up performing the function at the wrong time with respect to the first clock signal because the phase relationship of the second clock signal changes relative to the first clock signal is lost when the time delay is adjusted.

For example, FIG. 2 shows a first clock signal 202 and a second clock signal 204 that is generated based on the first clock signal 202. The second clock signal 204 has a frequency that is twice that of the first clock signal 202, and is in phase with the first clock signal 202. A third clock signal 206 also shown in FIG. 2 is a delayed version of the second clock signal 204 having a time delay Td1 relative to the second clock signal 204. The time delay of the third clock signal 206 is provided by an adjustable delay line circuit (not shown). The third clock signal 206 is used for timing a circuit, for example, timing a conventional latch circuit (not shown) that outputs data in response to every other rising edge of the third clock signal 206. The rising edge of the third clock signal 206 that causes data to be output is generally coincident with the rising edge of the first clock signal 202. As a result, data 220 is output in response to the rising edge of the third clock signal 206 at a time T1, which generally coincides with the rising edge of the first clock signal 202 at a time T0. Similarly, data 222 is output in response to the rising edge of the third clock signal 206 at a time T3, which generally coincides with the rising edge of the first clock signal 202 at a time T2.

FIG. 2 further illustrates a clock signal 206' having a new time delay Td2 relative to the second clock signal 204. The clock signal 206' represents the second clock signal after the time delay of the adjustable delay circuit is changed to the new time delay Td2. As previously described, the latch circuit receiving the clock signal 206' outputs data in response to every other rising edge. Thus, data 224 is output in response to the rising edge of the clock signal 206' at a time T5, and data 226 is output in response to the rising edge of the clock signal 206' at a time T7. However, as shown in FIG. 2, in changing the time delay of the delay line circuit, the phase relationship between the third clock signal 206 and the first clock signal 202 is lost. The first rising edge of the clock signal 206' at a time T5 is in response to the rising edge of the second clock signal 204 at a time T4. Consequently, the time at which data is output by the latch is no longer generally coincident with the rising edge of the first clock signal 202. As shown in FIG. 2, the data 224 and 226 are output generally coincident with the falling edges of the first clock signal 202 at times T4 and T6, respectively. The clock signals 206 and 206' illustrate how changing the time delay of a conventional delay circuit may result in an output clock signal losing its phase relationship relative to another clock signal. With respect to FIG. 2, the lost phase relationship results in data being output by the latch circuit 180 degrees out of phase from when it should be output. Additionally, where other circuitry in the memory device or a memory controller coupled to the memory device are synchronized by respective clock signals that are also based on the second clock signal 204, the latch circuit of the present example is now no longer synchronized with the other circuitry either within the memory device or with the memory controller, and consequently, an error will undoubtedly occur Clearly, the situation described with respect to FIG. 2 would be undesirable.

SUMMARY OF THE INVENTION

In one aspect of the invention, a method of generating a clock signal based on a first clock signal is provided. The method includes generating an internal clock signal based on the first clock signal having a higher clock frequency than the first clock signal. The internal clock signal has an initial phase relationship relative to a clock edge of the first clock signal. The initial phase relationship of the internal clock signal to the first clock signal is changed to an adjusted phase relationship. A phase synchronizer signal is generated having a phase relationship relative to the first clock signal and a logic level to track the clock edge to which the initial phase relationship is relative. Based on the phase synchronizer signal, the internal clock signal is generated having the adjusted phase relationship and further having a first clock pulse relative to the same clock edge from which the initial phase relationship was relative.

In another aspect of the invention, a synchronizer circuit is provided including a shift register that shifts a logic level from an input terminal to an output terminal in response to an internal clock signal. The synchronizer circuit further includes an input multiplexer control circuit having an input coupled to a downstream tap of the shift register. In response to a first logic level coupled to the downstream tap, the input multiplexer control circuit generates an input multiplexer control signal that causes an input multiplexer to decouple a delay circuit from receiving the internal clock signal. The multiplexer control circuit further generates a phase synchronizer signal to track the phase relationship of a pseudo-synchronized clock signal provided by the delay circuit relative to a rising or falling edge of a core clock signal. In response to a second logic level coupled to the downstream tap of the shift register, the input multiplexer control circuit generates an input multiplexer control signal based on the synchronizer signal to recouple the input of the delay circuit to receive the internal clock signal at a time to provide the pseudo-synchronized clock signal having a new phase relationship, but still relative to the rising or falling edge of the core clock signal tracked by the input multiplexer control circuit.

BRIEF DESCRIPTION OF THE DRAWINGS

FIG. 1 is a timing diagram of various related clock signals generated according to the prior art.

FIG. 2 is a timing diagram of various signals according to the operation of prior art delay lines.

FIG. 3 is a functional block diagram of a synchronizer circuit according to an embodiment of the present invention.

FIG. 4 is a partial function block diagram of conventional delay circuit having a multiplexed input and a multiplexed output controlled by the synchronizer circuit of FIG. 3.

FIG. 5 is a timing diagram of various signals of the operation of the synchronizer circuit of FIGS. 3 and 4.

FIG. 6 is a functional block diagram of a synchronous memory device in which embodiments of the present invention can be utilized.

FIG. 7 is a partial block diagram of a computer system having a memory hub based system memory in which embodiments of the present invention can be implemented.

DETAILED DESCRIPTION OF PREFERRED EMBODIMENTS

Figure 3:
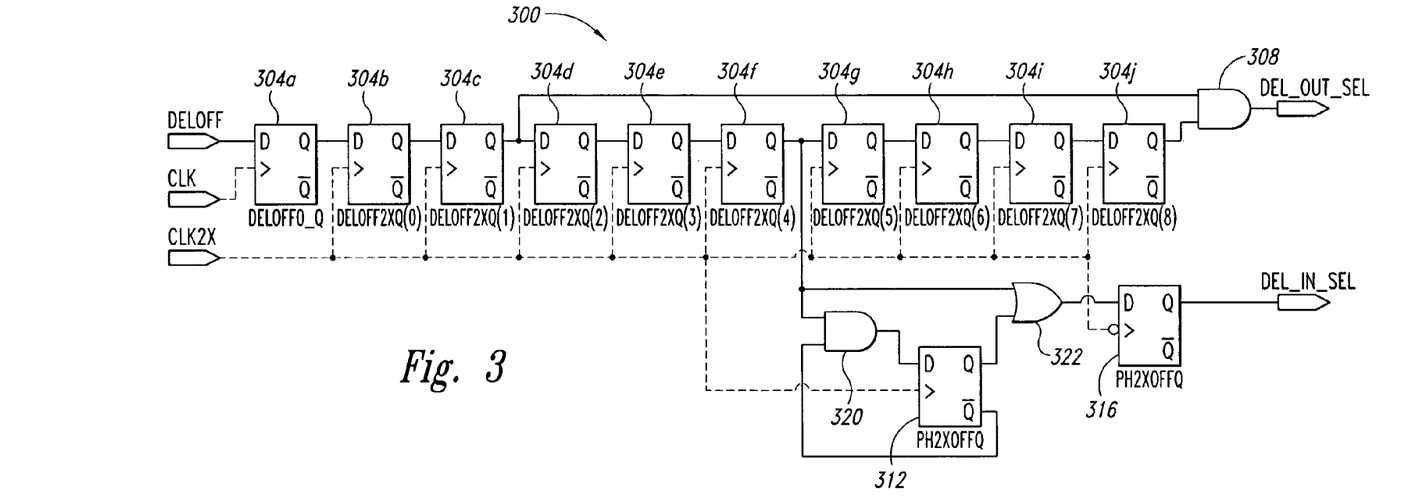

FIG. 3 illustrates a synchronizer circuit 300 according to an embodiment of the present invention. As will be described in greater detail below, the synchronizer circuit 300 can be used with a conventional adjustable delay circuit to preserve a pseudo-synchronous phase relationship between clock signals of different clock domains when the time delay of the adjustable delay circuit from which one of the clock signals is output is changed. Certain details are set forth below to provide a sufficient understanding of the invention. However, it will be clear to one skilled in the art that the invention may be practiced without these particular details. In other instances, well-known circuits, control signals, and timing protocols have not been shown in detail in order to avoid unnecessarily obscuring the invention.

Figure 1:
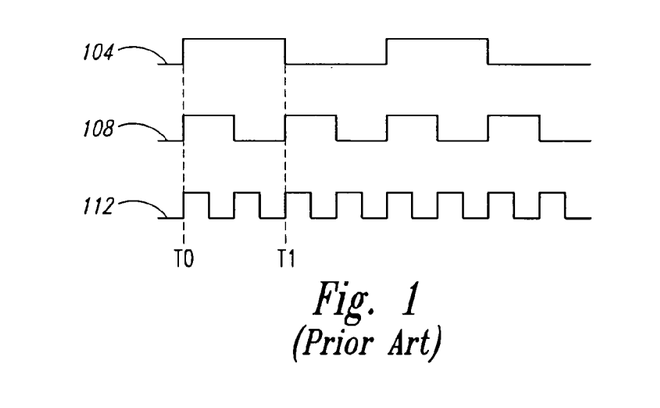
Figure 2:
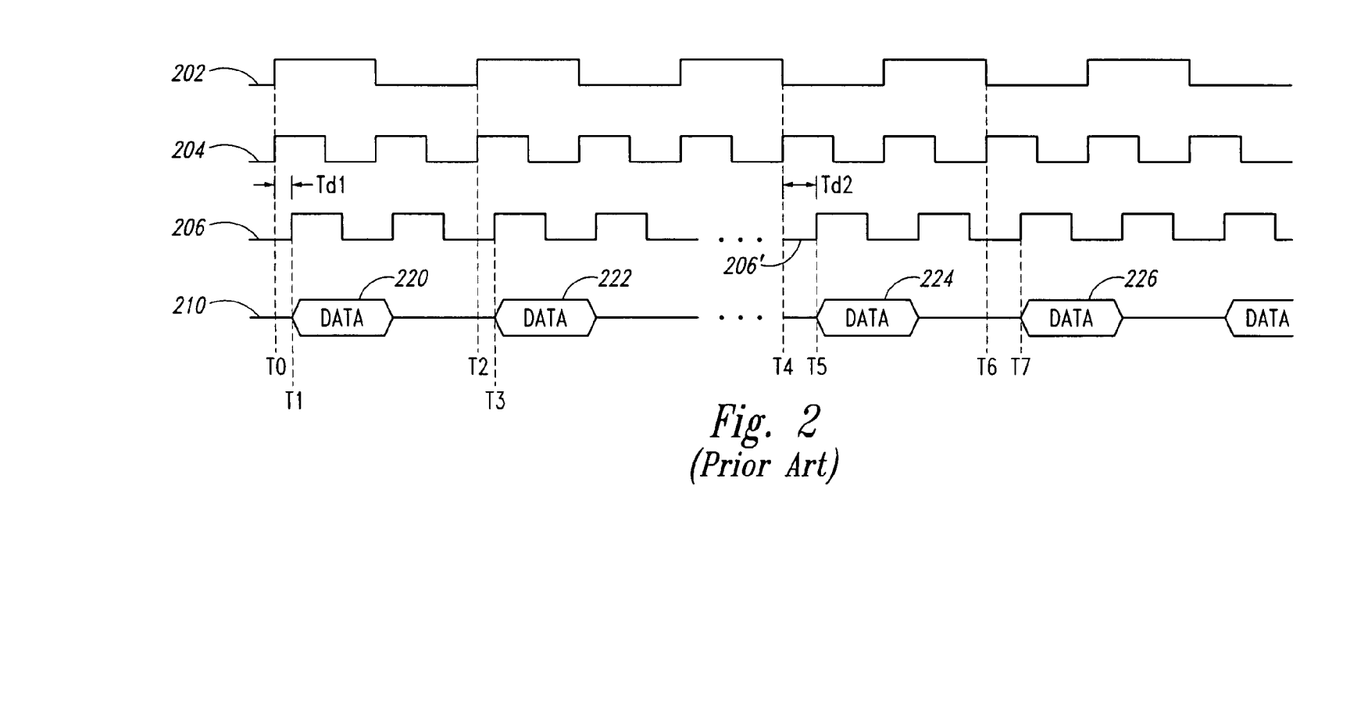

The synchronizer circuit 300 includes a plurality of series connected positive edge triggered D flip-flops 304a–j. The first flip-flop 304a is coupled to receive a control signal DELOFF and a first clock signal CLK having a first frequency. It will be appreciated that the CLK signal can represent a core clock signal of a first clock domain. As will be explained in greater detail below, an active (HIGH) DELOFF signal indicates that changing the time delay of an adjustable delay circuit (shown in FIG. 2) to which the synchronizer circuit 300 is coupled has been requested. The remaining series connected flip-flops 304b–j are coupled to receive a second clock signal CLK2X. The CLK2X signal has a frequency that is twice that of the CLK signal and can represent a clock signal in a second clock domain. The CLK2X signal can be generated based on the CLK signal, and the CLK2X signal is in phase with the CLK signal. It will be appreciated that the CLK2X signal can be generated using conventional circuits well known in the art. The "true" outputs of the flip-flop 304c and 304j are coupled to a two-input AND gate, the output of which provides a delay output select signal DEL_OUT_SEL.

The synchronizer circuit 300 further includes a D flip-flop 312 is coupled to receive at its input the output of a two input AND gate 320 having a first input coupled to the true output of the flip-flop 304f and a second input coupled to the "not" output of the flip-flop 312. The flip-flop 312 is coupled to trigger in response to the positive edge of the CLK2X signal. A D flip-flop 316 is coupled to receive at its input the output of a two input OR gate 322 having a first input coupled to the true output of the flip-flop 304f and a second input coupled to the true output of the D flip-flop 312. The D flip-flop 316 is coupled to trigger in response to the negative edge of the CLK2X signal. The true output of the flip-flop 316 provides a delay input select signal DEL_IN_SEL.

Figure 4:
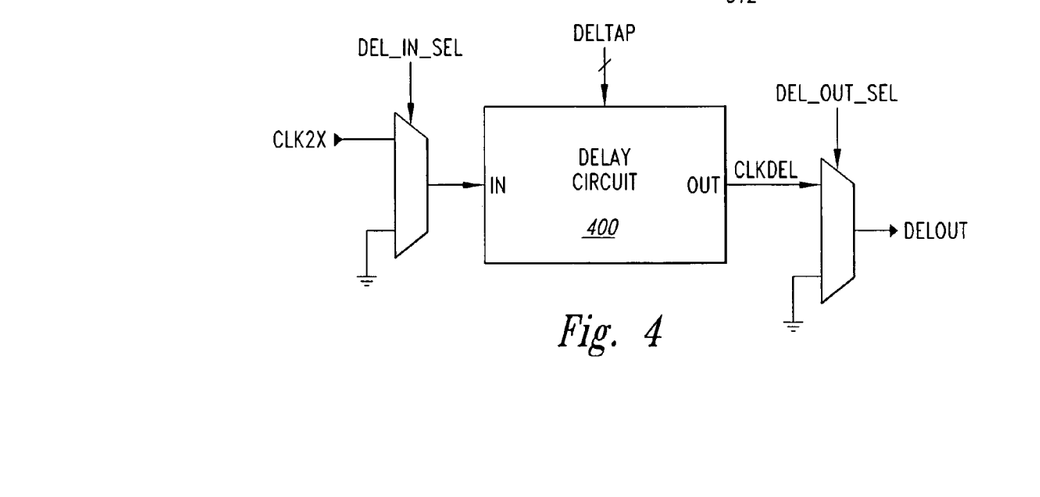

FIG. 4 illustrates a portion of the synchronizer circuit 300 coupled to a conventional delay circuit 400. The input of the conventional delay circuit 400 is coupled to the output of a multiplexer 401. A first input of the multiplexer 401 is coupled to receive the CLK2X signal, and a second input is coupled to ground. In an alternative embodiment, a delay circuit includes internally multiplexed inputs, as known in the art. The delay circuit 400 provides an output clock signal CLKDEL based on the CLK2X signal that has a time delay based on a control value DELTAP. The DELTAP value is typically represented by a plurality of signals that sets the time delay of the delay circuit 400. Generation of such signals is conventional, and will not be discussed herein for the sake of brevity. The output of the delay circuit 400 is coupled to a first input of a multiplexer 402. A second input of the multiplexer 402 is coupled to ground. Thus, under the control of the DEL_OUT_SEL signal, the multiplexer 402 provides either the CLKDEL signal or ground as an output signal DELOUT. The DEL_IN_SEL and DEL_OUT_SEL signals are provided by the synchronizer circuit 300 shown in FIG. 3. As will be explained in more detail below, decoupling the input clock signal minimizes the occurrence of a glitch pulse from being output from the delay line circuit. After the new value is applied to the delay line circuit, the input clock signal is recoupled to the input of the delay line circuit, and the output signal of the delay line circuit will be delayed by the new time delay. As previously mentioned, the delay circuit 400 is conventional, and many designs suitable for use with embodiments of the invention are well known by those ordinarily skilled in the art.

Figure 5:
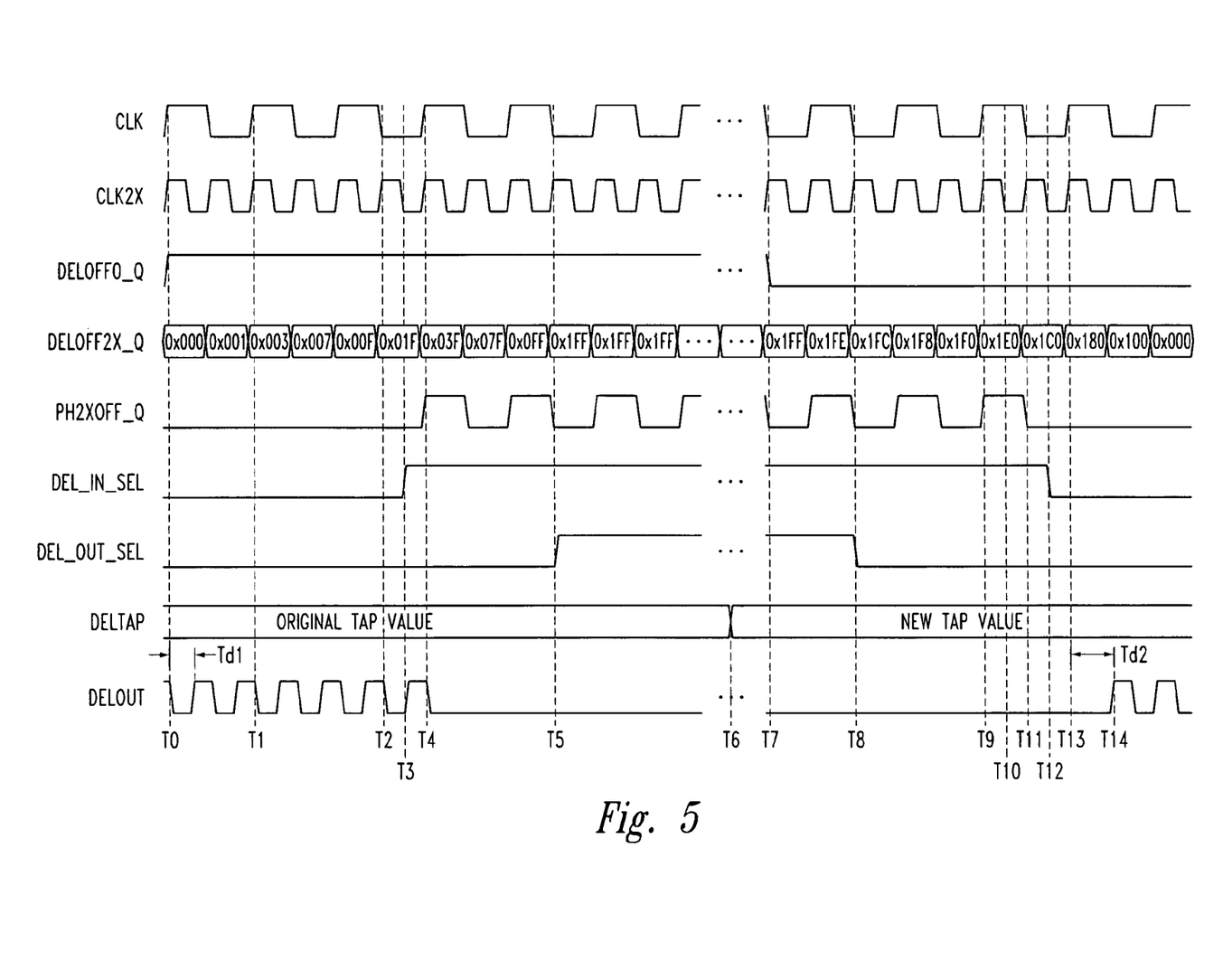

Operation of the synchronizer circuit and the delay circuit 400 will be explained with reference to the timing diagram of FIG. 5. FIG. 5 illustrates the CLK signal and the CLK2X signal derived from and in phase with the CLK signal. Initially, the DELOFF signal (FIG. 3) is LOW. Consequently, the DEL_IN_SEL and DEL_OUT_SEL signals are also LOW. As a result, the CLK2X is coupled to the delay circuit 400 (FIG. 4) and the DELOUT signal is provided by the CLKDEL signal output by the delay circuit 400. As shown in FIG. 5, the DELOUT signal is a delayed version of the CLK2X signal having a time delay Td1 set by the current DELTAP value.

As previously discussed, an active DELOFF signal is used to initiate an operation to allow for the DELTAP value for the delay circuit 400 (FIG. 4) to be changed. At a time prior to a time T0, the DELOFF signal becomes HIGH (not shown), indicating that initiation of the operation has been requested. At the time T0, in response to the positive edge of the CLK signal and the HIGH DELOFF signal, the flip-flop 304a outputs a HIGH signal. The HIGH signal generated by the flip-flop 304a begins to propagate through the plurality of series coupled flip-flops 304b–j, with the true output of each of the flip-flops 304b–j switching HIGH in sequence in response to a positive edge of the CLK2X signal. The flip-flops 304b and 304c are coupled such that a stable signal will be output by the flip-flop 304c at a second positive edge of the CLK2X signal even if the flip-flop 304b is metastable at a first positive edge of the CLK2X signal. The switching of the flip-flops 304b-j in sequence for every positive edge of the CLK2X signal is represented by the DELOFF2X_Q signal in FIG. 5. The DELOFF2X_Q signal represents a hexadecimal value corresponding to a nine-bit number, where each flip-flop 304b–j corresponds to one bit of the nine-bit number. The output of the flip-flop 304b represents the least significant bit and the output of the flip-flop 304j represents the most significant bit. As shown in FIG. 5, the hexadecimal value represented by the DELOFF2X_Q signal changes as the respective flip-flop 304b–j switches from LOW to HIGH. For example, at a time T1, two clock periods of the CLK2X signal after the time T0, the output of the flip-flop 304c switches HIGH. The DELOFF2X_Q signal at the time T1 has a value of 0x003H, corresponding to the flip-flops 304b and 304c having HIGH outputs and the remaining flip-flops 304d–j having LOW outputs at the time T1. The output of the AND gate 308 remains LOW although one of its inputs is HIGH. It will be appreciated that the DELOFF2X_Q signal is not necessary for the operation of the synchronizer circuit 300, but has been illustrated in FIG. 5 for the purpose of describing the operation of the synchronizer circuit 300.

At a time T2, the output of the flip-flop 304f switches HIGH in response to the positive edge of the CLK2X signal. The DELOFF2X_Q signal reflects the change of flip-flop 304f by having a value of 0x01FH at the time T2, corresponding to the HIGH outputs of flip-flops 304b–304f. In response to the flip-flop 304f having a HIGH output, the input to the flip-flop 316 switches from HIGH to LOW. At the next negative edge of the CLK2X signal following the positive edge at the time T2, the DEL_IN_SEL signal provided at the output of the flip-flop 316 switches from LOW to HIGH at a time T3. The DEL_IN_SEL signal switching from LOW to HIGH causes the multiplexer 401 (FIG. 4) to decouple the CLK2X signal from the input of the delay circuit 400, and couple the ground as the input. In response, as the last CLK2X pulse propagates through the delay circuit 400, as shown in FIG. 5, the DELOUT signal eventually goes LOW as well at a time T4. The DEL_IN_SEL signal will remain HIGH until after the output of the flip-flop 304f switches to LOW.

At a time T5, the output of the flip-flop 304j switches HIGH in response to the positive edge of the CLK2X signal and the DEL_OUT_SEL signal at the output of the AND gate 308. The HIGH DEL_OUT_SEL signal causes the multiplexer 402 to couple its output to ground, thus, decoupling the output of delay circuit 400 from providing the DELOUT signal. The sequence of decoupling the input of the delay circuit 400 from receiving the CLK2X signal at the time T3 and then decoupling the output of the delay circuit 400 from the output of the multiplexer 402 at the time T5 allows the delay circuit 400 to drain any runt pulses. That is, any part of a clock pulse of the CLK2X signal cutoff at the time the DEL_IN_SEL signal goes HIGH to propagate through the delay circuit 400 before decoupling its output. With the input and output of the delay circuit 400 decoupled, the DELTAP value can be changed at a time T6 to adjust the time delay of the delay circuit 400.

As previously discussed, problems may arise if the phase of a clock signal in the second time domain relative to a clock in the first time domain is not maintained when the delay circuit is recoupled to provide an output clock signal. In FIG. 5, the DELOUT signal represents the clock signal in the second time domain and the CLK signal represents the clock signal in the first time domain. The synchronizer circuit 400 uses flip-flop 312 to keep track of the phase relationship between the DELOUT signal and the CLK signal while the delay circuit 400 is decoupled so that the first clock pulse of the DELOUT signal after recoupling the delay circuit 400 will have the same general phase relationship with the CLK signal as before the delay circuit 400 was decoupled. With reference to FIG. 5, the last clock pulse of the DELOUT signal is output at the time T3. The last clock pulse is the delayed version of the clock pulse of the CLK2X signal having a positive edge at the time T2, which coincides with a negative edge of the CLK signal. Consequently, in order to maintain the correct relative phase relationship between the DELOUT signal and the CLK signal, the first clock pulse of the DELOUT signal after the DELTAP value is changed should follow a positive edge of the CLK signal.

In operation, the output of the flip-flop 312 is LOW until it switches HIGH at a time T4 in response to the next positive edge of the CLK2X signal following the time T3 when the output of the flip-flop 304f switches HIGH. In the arrangement shown, the output of the flip-flop 312, shown in FIG. 5 as a PH2XOFF_Q signal will switch between HIGH and LOW in response to every positive edge of the CLK2X signal after the time T4 until the output of the flip-flop 304f switches back to LOW. As will be described in more detail below, the toggling of the flip-flop 312 is used to keep track of the phase relationship between the DELOUT signal and the CLK signal during the time the delay circuit 400 is decoupled.

Following the time T6 but before a time T7, the DELOFF signal input to the flip-flop 304a goes LOW (not shown) indicating that recoupling of the input and output of the delay circuit 400 has been requested. The output of the flip-flop 304a goes LOW at the time T7 in response to the positive edge of the CLK2X signal. The LOW output of the flip-flop 304a will begin to propagate through the remaining flip-flops 304b–j in sequence in response to each positive edge of the CLK2X signal. At a time T8, the output of the flip-flop 304c switches to LOW, and in response, the DEL_OUT_SEL signal of the AND gate 308 switches LOW. The LOW DEL_OUT_SEL signal causes the multiplexer 402 to recouple the output of the delay circuit 400 to provide the CLKDEL signal as the DELOUT signal. At the time T8, although the output of the delay circuit 400 is recoupled, the input has yet to be recoupled to receive the CLK2X signal. Consequently, the output of the delay circuit at this time is still LOW.

At a time T9, the output of the flip-flop 304f switches LOW in response to the positive edge of the CLK2X signal. The LOW output of the flip-flop 304f will cause the DEL_IN_SEL signal output by the flip-flop 316 to switch to LOW at the following negative edge of the CLK2X signal if the output of the flip-flop 312 is also LOW. However, as shown in FIG. 5, at a time T10 corresponding to the following negative edge of the CLK2X signal, the output of the flip-flop 312 is still HIGH. Consequently, the DEL_IN_SEL signal does not switch LOW at a time T10. At a time T11 corresponding to the next positive edge of the CLK2X signal, the output of the flip-flop 312 switches LOW because of the LOW output of the flip-flop 304f at the time T8. At a time T12 corresponding to the next negative edge of the CLK2X signal, the DEL_IN_SEL signal output by the flip-flop 316 finally goes LOW. The DEL_IN_SEL signal switches low because the output of the OR gate switched low when the output of the flip-flop 312 switched low at the time T11. In response to the DEL_IN_SEL signal switching LOW, the multiplexer 401 recouples the CLK2X signal to the input of the delay circuit 400. Thus, the positive edge of the CLK2X signal at a time T13 represents the positive edge of the first clock pulse of the CLK2X signal to be input to the delay circuit 400 following the change of the DELTAP value. The positive edge of the first clock pulse of the DELOUT signal at a time T14 represents the positive edge corresponding to the positive edge of the CLK2X signal at the time T13. The DELOUT signal is delayed by a new delay time Td2, which corresponds to the new DELTAP value that was applied to the delay circuit 400 at the time T6.

As shown in FIG. 5, the DELOUT signal retains its phase relationship with respect to the CLK signal. That is, as previously discussed, in order for the relative phase relationship between the DELOUT signal and the CLK signal to be maintained, the first clock pulse of the DELOUT signal should correspond to a positive edge of the CLK signal, which is the case shown in FIG. 5. The relative phase relationship between the DELOUT signal and the CLK signal is maintained because the DEL_IN_SEL signal is not allowed to recouple the CLK2X signal to the input of the delay circuit 400 until the correct phase of the CLK signal, as kept track by the flip-flop 312 toggling between HIGH and LOW in response to the CLK2X signal.

It will be appreciated that minor modifications can be made to the synchronizer circuit 300 without departing from the scope of the present invention. For example, the number of series coupled flip-flops 304a–j can be modified to change the relative timing of the various signals used for decoupling and recoupling the delay line 400 to provide the DELOUT signal. Alternatively, the output of which flip-flop 304a–j the flip-flops 312 and 316 are coupled can be modified to change the relative timing of the various signals as well.

In an alternative embodiment of the invention, the synchronizer circuit 300 is modified for use with a clock signal that has a higher multiple of the frequency of the CLK signal, for example, 4× the frequency of the CLK signal. An asynchronous FIFO (not shown) can substituted for the flip-flop 312 in order to keep track of the four possible positive edges that occur for one period of the CLK signal. Minor modifications well within the understanding of those ordinarily skilled in the art may be made to the logic circuits coupled to the asynchronous FIFO in the case clock signals having higher multiples of the frequency of the CLK signal are used. Using the asynchronous FIFO provides that the first clock pulse of the DELOUT signal following the recoupling of the output of the delay circuit 400 will occur having the same relative phase relationship with CLK signal as when the input of the delay circuit 400 was decoupled from receiving the clock signal having 4× the frequency of the CLK signal. Such asynchronous FIFOs are well known to those ordinarily skilled in the art, and can be implemented using conventional designs and circuitry. A conventional 1:n counter circuit or a timing chain can also be used to track the phase relationship relative to the CLK signal in order to maintain the correct phase relationship when the first pulse of the delayed clock signal is output by the delay circuit 400. It will be appreciated that other substitutions can be made for the flip-flop 312 without departing from the scope of the present invention.

Figure 6:
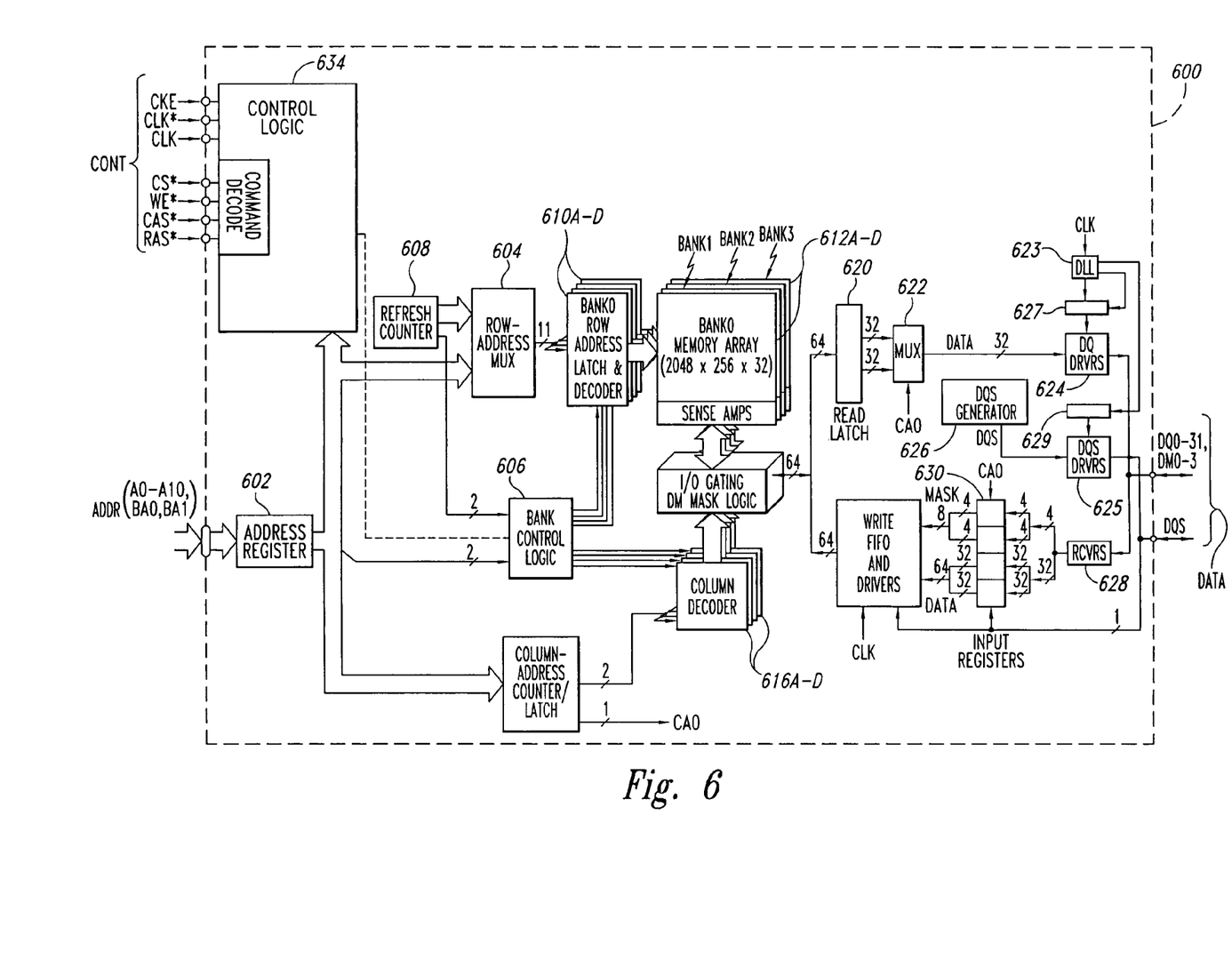

FIG. 6 is a functional block diagram of a memory device 600 in which embodiments of the present invention can be implemented. The memory device 600 in FIG. 6 is a double-data rate (DDR) synchronous dynamic random access memory ("SDRAM"), although the principles described herein are applicable to any memory device that may include a synchronizing circuit for synchronizing internal and external signals, such as conventional synchronous DRAMs (SDRAMs), as well as packetized memory devices like SLDRAMs and RDRAMs, and are equally applicable to any integrated circuit that must synchronize internal and external clocking signals.

The memory device 600 includes a control logic and command decoder 634 that receives a plurality of command and clocking signals over a control bus CONT, typically from an external circuit such as a memory controller (not shown). The command signals typically include a chip select signal CS*, a write enable signal WE*, a column address strobe signal CAS*, and a row address strobe signal RAS*, while the clocking signals include a clock enable signal CKE and complementary clock signals CLK, CLK*, with the "*" designating a signal as being active low. The command signals CS*, WE*, CAS*, and RAS* are driven to values corresponding to a particular command, such as a read, write, or auto-refresh command. The CKE signal is used to activate and deactivate the internal clock, input buffers and output drivers. In response to the clock signals CLK, CLK*, the command decoder 634 latches and decodes an applied command, and generates a sequence of clocking and control signals that control the components 602–632 to execute the function of the applied command. The command decoder 634 latches command and address signals at positive edges of the CLK, CLK* signals (i.e., the crossing point of CLK going high and CLK* going low), while the input registers 630 and data drivers 624 transfer data into and from, respectively, the memory device 600 in response to both edges of the data strobe signal DQS and thus at double the frequency of the clock signals CLK, CLK*. This is true because the DQS signal has the same frequency as the CLK, CLK* signals. The memory device 600 is referred to as a double-data-rate device because the data words DQ being transferred to and from the device are transferred at double the rate of a conventional SDRAM, which transfers data at a rate corresponding to the frequency of the applied clock signal. The detailed operation of the control logic and command decoder 634 in generating the control and timing signals is conventional, and thus, for the sake of brevity, will not be described in more detail.

Further included in the memory device 600 is an address register 602 that receives row, column, and bank addresses over an address bus ADDR, with a memory controller (not shown) typically supplying the addresses. The address register 602 receives a row address and a bank address that are applied to a row address multiplexer 604 and bank control logic circuit 606, respectively. The row address multiplexer 604 applies either the row address received from the address register 602 or a refresh row address from a refresh counter 608 to a plurality of row address latch and decoders 610A–D. The bank control logic 606 activates the row address latch and decoder 610A–D corresponding to either the bank address received from the address register 602 or a refresh bank address from the refresh counter 608, and the activated row address latch and decoder latches and decodes the received row address. In response to the decoded row address, the activated row address latch and decoder 610A–D applies various signals to a corresponding memory bank 612A–D to thereby activate a row of memory cells corresponding to the decoded row address. Each memory bank 612A–D includes a memory-cell array having a plurality of memory cells arranged in rows and columns, and the data stored in the memory cells in the activated row is stored in sense amplifiers in the corresponding memory bank. The row address multiplexer 604 applies the refresh row address from the refresh counter 608 to the decoders 610A–D and the bank control logic circuit 606 uses the refresh bank address from the refresh counter when the memory device 600 operates in an auto-refresh or self-refresh mode of operation in response to an auto- or self-refresh command being applied to the memory device 600, as will be appreciated by those skilled in the art.

A column address is applied on the ADDR bus after the row and bank addresses, and the address register 602 applies the column address to a column address counter and latch 614 which, in turn, latches the column address and applies the latched column address to a plurality of column decoders 616A–D. The bank control logic 606 activates the column decoder 616A–D corresponding to the received bank address, and the activated column decoder decodes the applied column address. Depending on the operating mode of the memory device 600, the column address counter and latch 614 either directly applies the latched column address to the decoders 616A–D, or applies a sequence of column addresses to the decoders starting at the column address provided by the address register 602. In response to the column address from the counter and latch 614, the activated column decoder 616A–D applies decode and control signals to an I/O gating and data masking circuit 618 which, in turn, accesses memory cells corresponding to the decoded column address in the activated row of memory cells in the memory bank 612A–D being accessed.

During data read operations, data being read from the addressed memory cells is coupled through the I/O gating and data masking circuit 618 to a read latch 620. The I/O gating and data masking circuit 618 supplies N bits of data to the read latch 620, which then applies two N/2 bit words to a multiplexer 622. In the embodiment of FIG. 6, the circuit 618 provides 64 bits to the read latch 620 which, in turn, provides two 32 bits words to the multiplexer 622. A data driver 624 sequentially receives the N/2 bit words from the multiplexer 622 and also receives a clock signal to synchronize the data driver 624 from a clock generator 627 having a synchronizing circuit according to an embodiment of the present invention. The clock generator 627 is coupled to receive a delayed clock signal from a delay locked loop (DLL) 623. As known in the art, the DLL can be used to generate a clock signal that is in synchronicity with another clock signal. The clock generator 627 provides a delayed version of the clock signal from the DLL to the data driver 624 having a pseudo-synchronous phase relationship between clock signals of different clock domains. Adjustment of the phase relationship by the clock generator 627 is made by adjusting the time delay of an adjustable delay circuit. The synchronizing circuit included in the clock generator is used to maintain the general phase relationship between the clock signal output by the clock generator 627 and a clock signal in another clock domain.

A data strobe driver 626 receives a data strobe signal DQS from a strobe signal generator 626. The data strobe driver 626 is coupled to a clock generator 629, which provides the data strobe driver 626 with a clock signal used for synchronizing its operation. AS with the clock generator 627, the clock generator 629 includes a synchronizing circuit according to an embodiment of the present invention to maintain the pseudo-synchronous phase relationship between clock signals of different clock domains. The clock generator 629 receives and input clock signal from the DLL 623. The DQS signal is used by an external circuit such as a memory controller (not shown) in latching data from the memory device 600 during read operations. In response to the delayed clock signal CLKDEL, the data driver 624 sequentially outputs the received N/2 bits words as a corresponding data word DQ, each data word being output in synchronism with a rising or falling edge of a CLK signal that is applied to clock the memory device 600. The data driver 624 also outputs the data strobe signal DQS having rising and falling edges in synchronism with rising and falling edges of the CLK signal, respectively. Each data word DQ and the data strobe signal DQS collectively define a data bus. As will be appreciated by those skilled in the art, the CLKDEL signal from the DLL 623 is a delayed version of the CLK signal, and the DLL 623 adjusts the delay of the CLKDEL signal relative to the CLK signal to ensure that the DQS signal and the DQ words are placed on the data bus to meet published timing specifications for the memory device 600. The data bus also includes masking signals DM0-M, which will be described in more detail below with reference to data write operations. It will be appreciated that the number of clock generators including in the memory device can be changed without departing from the scope of the present invention. For example, additional clock generators can be included for other internal clock signals to provide greater flexibility in changing the relative timing of those internal clock signals with respect to a core clock signal.

During data write operations, an external circuit such as a memory controller (not shown) applies N/2 bit data words DQ, the strobe signal DQS, and corresponding data masking signals DM0-X on the data bus. A data receiver 628 receives each DQ word and the associated DM0-X signals, and applies these signals to input registers 630 that are clocked by the DQS signal. In response to a rising edge of the DQS signal, the input registers 630 latch a first N/2 bit DQ word and the associated DM0-X signals, and in response to a falling edge of the DQS signal the input registers latch the second N/2 bit DQ word and associated DM0-X signals. The input register 630 provides the two latched N/2 bit DQ words as an N-bit word to a write FIFO and driver 632, which clocks the applied DQ word and DM0-X signals into the write FIFO and driver in response to the DQS signal. The DQ word is clocked out of the write FIFO and driver 632 in response to the CLK signal, and is applied to the I/O gating and masking circuit 618. The I/O gating and masking circuit 618 transfers the DQ word to the addressed memory cells in the accessed bank 612A–D subject to the DM0-X signals, which may be used to selectively mask bits or groups of bits in the DQ words (i.e., in the write data) being written to the addressed memory cells.

Figure 7:
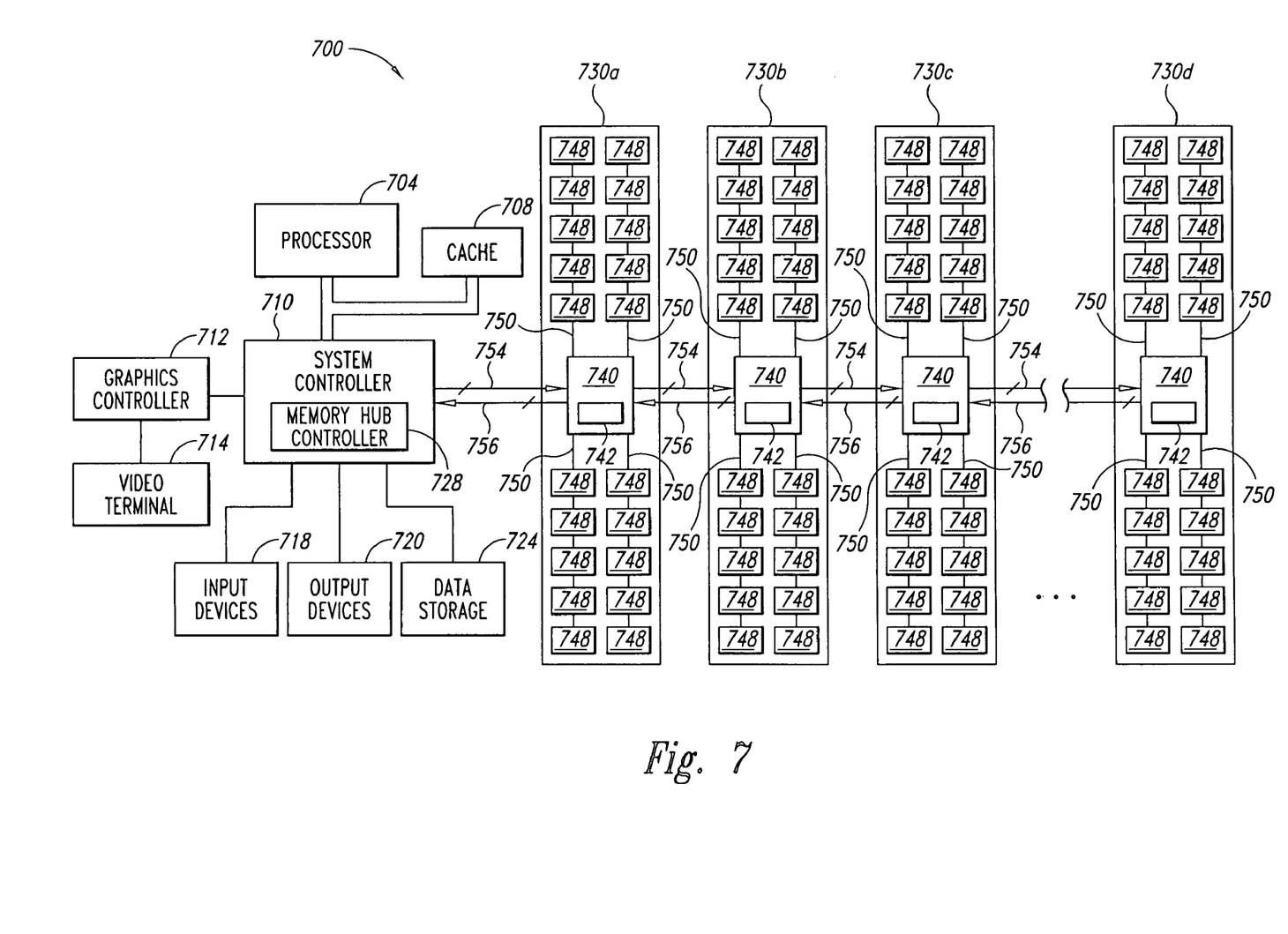

FIG. 7 illustrates a computer system 700 having a memory hub architecture in which embodiments of the present invention can be utilized. The computer system 700 includes a processor 704 for performing various computing functions, such as executing specific software to perform specific calculations or tasks. The processor 704 includes a processor bus 706 that normally includes an address bus, a control bus, and a data bus. The processor bus 706 is typically coupled to cache memory 708, which, is typically static random access memory ("SRAM"). The processor bus 706 is further coupled to a system controller 710, which is also referred to as a bus bridge.

The system controller 710 also serves as a communications path to the processor 704 for a variety of other components. More specifically, the system controller 710 includes a graphics port that is typically coupled to a graphics controller 712, which is, in turn, coupled to a video terminal 714. The system controller 710 is also coupled to one or more input devices 718, such as a keyboard or a mouse, to allow an operator to interface with the computer system 700. Typically, the computer system 700 also includes one or more output devices 720, such as a printer, coupled to the processor 704 through the system controller 710. One or more data storage devices 724 are also typically coupled to the processor 704 through the system controller 710 to allow the processor 704 to store data or retrieve data from internal or external storage media (not shown). Examples of typical storage devices 724 include hard and floppy disks, tape cassettes, and compact disk read-only memories (CD-ROMs).

The system controller 710 contains a memory hub controller 728 coupled to several memory modules 730a–n through a bus system 734. Each of the memory modules 730a–n includes a memory hub 740 coupled to several memory devices 748 through command, address and data buses, collectively shown as bus 750. The memory hub 740 efficiently routes memory requests and responses between the controller 728 and the memory devices 748. The memory devices 748 can be synchronous DRAMs, such as the memory device 600 previously described with respect to FIG. 6. Each of the memory hubs 740 includes write buffers and read data buffers. Computer systems employing this architecture allow for the processor 704 to access one memory module 730a–n while another memory module 730a–n is responding to a prior memory request. For example, the processor 704 can output write data to one of the memory modules 730a–n in the system while another memory module 730a–n in the system is preparing to provide read data to the processor 704. Additionally, a memory hub architecture can also provide greatly increased memory capacity in computer systems.

Embodiments of the present invention can be utilized in the memory devices 748, the memory hub controller 728, or the memory hub 740. As shown in FIG. 7, the memory hubs 740 include a synchronizer circuit 742 according to an embodiment of the present invention. As previously described, the synchronizer circuit 742 can be used with adjustable delay circuits to preserve a pseudo-synchronous phase relationship between clock signals of different clock domains when the time delay of the adjustable delay circuit from which one of the clock signals is output is changed. With respect to the memory hubs 740, the pseudo-synchronous relationship may be between clock signals utilized to synchronize internal operations of the memory hubs 740 as well as for clock signals utilized for synchronizing external operation, for example, operation with the memory devices 748.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for generating a clock signal, comprising:
receiving a first clock signal;
generating a second clock signal based on the first clock signal, the second clock signal having a higher clock frequency than the first clock signal and further having a phase relationship with respect to the first clock signal related to a first time delay and relative to a rising or falling edge of the first clock signal;
adjusting the first time delay to which the phase relationship between the first and second clock signals is related to a second time delay;
monitoring the phase relationship between the first and second clock signals during adjustment of the first time delay to the second time delay; and
generating a third clock signal based on the first clock signal, the third clock signal having the clock frequency of the second clock signal and having a phase relationship with respect to the first clock signal related to the second time delay relative to the rising or falling edge to which the first time delay was relative.

2. The method of claim 1 wherein adjusting the first time delay to a second time delay comprises:
decoupling an input of a delay circuit from receiving an input clock signal;
providing control signals indicative of the second time delay to the delay circuit to change the first time delay to the second time delay; and
recoupling the input of the delay circuit to receive the input clock signal.

3. The method of claim 2 wherein adjusting the first time delay to a second time delay further comprises:
decoupling an output of the delay circuit from which the second clock signal is provided; and
recoupling the output of the delay circuit from which the third clock signal is provided following provision of the control signals indicative of the second time delay.

4. The method of claim 3 wherein decoupling the input of the delay circuit occurs before decoupling the output of the delay circuit.

5. The method of claim 3 wherein recoupling the output of the delay circuit occurs before recoupling the input of the delay circuit.

6. The method of claim 2 wherein monitoring the phase relationship between the first and second clock signals comprises:
in response to decoupling the input of the delay circuit, generating a synchronizing signal to monitor a clock transition of the first clock signal from which the last clock pulse of the second clock signal is based;
in response to recoupling the input of the delay circuit, ceasing generation of the synchronizing signal at a time relative to the clock transition monitored in response to decoupling to provide the third clock signal having a first clock pulse that maintains the phase relationship between the first and second clock signals.

7. The method of claim 1, further comprising generating a synchronized internal clock signal based on the first clock signal and wherein generating the second clock signal comprises delaying the synchronized internal clock signal by the first time delay.

8. A method of generating a clock signal based on a first clock signal, the method comprising:
generating an internal clock signal based on the first clock signal having a higher clock frequency than the first clock signal, the internal clock signal having an initial phase relationship relative to a clock edge of the first clock signal;
changing the initial phase relationship of the internal clock signal to the first clock signal to an adjusted phase relationship;
generating a phase synchronizer signal having a phase relationship relative to the first clock signal and a logic level to track the clock edge to which the initial phase relationship is relative; and
based on the phase synchronizer signal, generating the internal clock signal having the adjusted phase relationship and further having a first clock pulse relative to the same clock edge from which the initial phase relationship was relative.

9. The method of claim 8 wherein changing the initial phase relationship of the internal clock signal to the adjusted phase relationship comprises:
decoupling an input of a delay circuit having a first time delay from receiving an input clock signal generated based on the first clock signal;
providing control signals indicative of a second time delay to the delay circuit to change the first time delay to the second time delay; and
recoupling the input of the delay circuit to receive the input clock signal.

10. The method of claim 9 wherein changing the initial phase relationship of the internal clock signal to the adjusted phase relationship further comprises:
decoupling an output of the delay circuit from which the internal clock signal is provided; and
recoupling the output of the delay circuit from which the internal clock signal is provided following provision of the control signals indicative of the second time delay.

11. The method of claim 10 wherein decoupling the input of the delay circuit occurs before decoupling the output of the delay circuit.

12. The method of claim 10 wherein recoupling the output of the delay circuit occurs before recoupling the input of the delay circuit.

13. The method of claim 9 wherein monitoring the phase relationship between the first and second clock signals comprises:
in response to decoupling the input of the delay circuit, generating a synchronizing signal to monitor a clock transition of the first clock signal from which the last clock pulse of the second clock signal is based;
in response to recoupling the input of the delay circuit, ceasing generation of the synchronizing signal at a time relative to the clock transition monitored in response to decoupling to provide the third clock signal having a first clock pulse that maintains the phase relationship between the first and second clock signals.

14. The method of claim 8, further comprising generating a synchronized internal clock signal based on the first clock signal and wherein generating the internal clock signal comprises delaying the synchronized internal clock signal by a time delay.

15. A clock synchronizer circuit for coupling to a delay circuit, the delay circuit having an input and output and further having a control terminal to which control signals are applied to set a time delay of the delay circuit, the clock synchronizer circuit comprising:
- a clock synchronizer input circuit having an input to which a clock synchronizer control signal is applied to initiate a clock synchronizer operation, a clock terminal to which a first clock signal is applied, and further having an output at which an initiate signal is provided in response to the first clock signal;
- a first shift register having an input coupled to the output of the clock synchronizer input circuit, a clock terminal to which a second clock signal is applied, and further having an output providing an output signal in response to the second clock signal, the second clock signal having a higher clock frequency than the first clock signal;
- a second shift register having an input coupled to the output of the first shift register, a clock terminal to which the second clock signal is applied, and further having an output providing an output signal in response to the second clock signal;
- an input multiplexer control circuit having an input at which a trigger signal is provided, a clock terminal to which the second clock signal is applied, and further having an output at which an input multiplexer select signal is provided in response to the second clock signal, the input multiplexer select signal based on the trigger signal;
- an input multiplexer having a first input to which the second clock signal is applied, a second input coupled to a reference voltage supply, an output terminal coupled to the input of the delay circuit, and further having a control terminal coupled to the output of the second multiplexer control circuit to couple the output terminal to the first or second inputs in response to the input multiplexer select signal; and
- a clock phase tracking circuit having an input coupled to the output of the second shift register, a clock terminal to which the second clock signal is applied, and further having an output at which a trigger signal is provided, the clock phase tracking circuit operable to track a phase relationship of a last clock pulse of the internal clock signal relative to the first clock signal and, in response to the clock synchronizer control signal, further operable to output a trigger signal to cause the delay circuit to output a first clock pulse of the internal clock signal at a time relative to the first clock signal to maintain the tracked phase relationship.

16. The clock synchronizer circuit of claim 15 wherein the input multiplexer control circuit comprises a negative edge D flip-flop.

17. The clock synchronizer circuit of claim 15 wherein the clock synchronizer input circuit comprises a positive edge D flip-flop.

18. The clock synchronizer circuit of claim 15 wherein the clock phase tracking circuit comprises:
- an AND logic gate having first and second inputs, and further having an output, the first input coupled to the output of the second shift register;
- an OR logic gate having first and second inputs, and further having an output, the first input coupled to the output of the second shift register; and
- a positive edge D flip-flop having an input coupled to the output of the AND logic gate, a true output coupled to the second input of the OR logic gate, and further having a not output coupled to the second input of the AND logic gate.

19. The clock synchronizer circuit of claim 15, further comprising:
- a third shift register stage having an input coupled to the output of the second shift register, a clock terminal to which the second clock signal is applied, and further having an output providing an output signal in response to the second clock signal;
- an output multiplexer control circuit having first and second input nodes coupled to the outputs of the first and second shift registers, respectively, and further having an output at which an output multiplexer select signal is provided based on the logic levels of the output signals of the first and second shift registers; and
- an output multiplexer having a first input coupled to the output of the delay circuit, a second output coupled to the reference voltage supply, an output terminal from which the internal clock signal is provided, and a control terminal coupled to the output of the first multiplexer control circuit to couple the output terminal to the first or second inputs in response to the output multiplexer select signal.

20. The clock synchronizer circuit of claim 19 wherein the output multiplexer control circuit comprises an AND logic gate.

21. The clock synchronizer of claim 15 wherein the first and second shift registers comprise a plurality of series coupled positive edge D flip-flops.

22. The clock synchronizer of claim 15 wherein the clock frequency of the second clock signal is a multiple of two of the clock frequency than the first clock signal.

23. The clock synchronizer of claim 15 wherein the clock frequency of the second clock signal is four times the clock frequency of the first clock signal.

24. A clock generator, comprising:
- a delay circuit having input and output terminals, and further having a control terminal at which control signals are applied to set a time delay of the delay circuit; and
- a synchronizer circuit having
  - a synchronizer input circuit having an input to which a initiation signal is applied, a clock terminal to which a first clock signal is applied, and an output at which the initiation signal is coupled in response to the first clock signal;
  - a shift register having an input terminal coupled to the output of the synchronizer input circuit, an output terminal, and a clock terminal to which a second clock signal is applied, the shift register shifting a logic level applied to the input terminal to the output terminal in response to the second clock signal, the shift register further having an upstream tap and a downstream tap at which the logic level propagating through the shift register is coupled at first and second times, respectively;
  - an input multiplexer having a first input to which the second clock signal is applied, a second input coupled to a reference voltage supply, an output coupled to the input of the delay circuit, and further having a selection terminal, the input multiplexer selectively coupling the first or second input to the output according to an input multiplexer control signal; and
  - an input multiplexer control circuit having an input coupled to the downstream tap, a clock terminal to which the second clock signal is applied, and further having an output coupled to the selection terminal of the input multiplexer, in response to a first logic level coupled to the downstream tap, the input multiplexer control circuit operable to generate an input multiplexer control signal to couple the second input of the input multiplexer to its output and further operable to generate a phase synchronizer signal to track the phase relationship of the second clock signal relative to a rising or falling edge of the first clock signal, in response to a second logic level coupled to the downstream tap, the input multiplexer control circuit operable to generate an input multiplexer control signal based on the synchronizer signal to couple the first input of the input multiplexer to its output at a time to provide an output clock signal having a phase relationship relative to the rising or falling edge of the first clock signal tracked by the input multiplexer control circuit.

25. The clock generator of claim 24 wherein the synchronizer circuit further comprises:
   an output multiplexer control circuit having a first input coupled to the upstream tap, a second input coupled to the output of the shift register, and further having an output at which an output multiplexer select signal is provided; and
   an output multiplexer having a first input coupled to the output of the delay circuit, a second input coupled to the reference voltage supply, an output at which a internal clock signal is provided, and further having a selection terminal coupled to the output of the output multiplexer control circuit, the output multiplexer selectively coupling the first or second input to the output according to the output multiplexer select signal.

26. The clock generator of claim 25 wherein the output multiplexer control circuit comprises an AND logic gate.

27. The clock generator of claim 24 wherein the synchronizer input circuit of the synchronizer circuit comprises a positive edge D flip-flop.

28. The clock generator of claim 24 wherein the clock phase tracking circuit of the synchronizer circuit comprises:
   an AND logic gate having first and second inputs, and further having an output, the first input coupled to the downstream tap of the shift register;
   an OR logic gate having first and second inputs, and further having an output, the first input coupled to the downstream tap of the shift register;
   a positive edge D flip-flop having an input coupled to the output of the AND logic gate, a true output coupled to the second input of the OR logic gate, and further having a not output coupled to the second input of the AND logic gate; and
   a negative edge D flip-flop having an input coupled to the output of the OR logic gate and a true output at which the input multiplexer control signal is provided.

29. The clock generator of claim 24 wherein the shift register of the synchronizer circuit comprises a plurality of series coupled positive edge D flip-flops.

30. The clock generator of claim 24 wherein the clock frequency of the second clock signal is a multiple of two of the clock frequency than the first clock signal.

31. The clock generator of claim 24 wherein the clock frequency of the second clock signal is four times the clock frequency of the first clock signal.

32. A memory device, comprising:
   an address bus;
   a control bus;
   a data bus;
   an address decoder coupled to the address bus;
   a read/write circuit coupled to the data bus;
   a data driver circuit coupled to the data bus;
   a control circuit coupled to the control bus;
   a memory-cell array coupled to the address decoder, control circuit, and read/write circuit; and
   a clock generator coupled to the data driver to provide an internal clock signal, the clock generator comprising:
      a delay circuit having input and output terminals, and further having a control terminal at which control signals are applied to set a time delay of the delay circuit; and
      a synchronizer circuit having
         a synchronizer input circuit having an input to which a initiation signal is applied, a clock terminal to which a first clock signal is applied, and an output at which the initiation signal is coupled in response to the first clock signal;
         a shift register having an input terminal coupled to the output of the synchronizer input circuit, an output terminal, and a clock terminal to which a second clock signal is applied, the shift register shifting a logic level applied to the input terminal to the output terminal in response to the second clock signal, the shift register further having an upstream tap and a downstream tap at which the logic level propagating through the shift register is coupled at first and second times, respectively;
         an input multiplexer having a first input to which the second clock signal is applied, a second input coupled to a reference voltage supply, an output coupled to the input of the delay circuit, and further having a selection terminal, the input multiplexer selectively coupling the first or second input to the output according to an input multiplexer control signal; and
         an input multiplexer control circuit having an input coupled to the downstream tap, a clock terminal to which the second clock signal is applied, and further having an output coupled to the selection terminal of the input multiplexer, in response to a first logic level coupled to the downstream tap, the input multiplexer control circuit operable to generate an input multiplexer control signal to couple the second input of the input multiplexer to its output and further operable to generate a phase synchronizer signal to track the phase relationship of the second clock signal relative to a rising or falling edge of the first clock signal, in response to a second logic level coupled to the downstream tap, the input multiplexer control circuit operable to generate an input multiplexer control signal based on the synchronizer signal to couple the first input of the input multiplexer to its output at a time to provide an output clock signal having a phase relationship relative to the rising or falling edge of the first clock signal tracked by the input multiplexer control circuit.

33. The memory device of claim 32 wherein the synchronizer circuit further comprises:
   an output multiplexer control circuit having a first input coupled to the upstream tap, a second input coupled to the output of the shift register, and further having an output at which an output multiplexer select signal is provided; and
   an output multiplexer having a first input coupled to the output of the delay circuit, a second input coupled to the reference voltage supply, an output at which a internal clock signal is provided, and further having a selection terminal coupled to the output of the output multiplexer control circuit, the output multiplexer selectively coupling the first or second input to the output according to the output multiplexer select signal.

34. The memory device of claim 33 wherein the output multiplexer control circuit of the synchronizer circuit comprises an AND logic gate.

35. The memory device of claim 32 wherein the synchronizer input circuit of the synchronizer circuit comprises a positive edge D flip-flop.

36. The memory device of claim 32 wherein the clock phase tracking circuit of the synchronizer circuit comprises:
an AND logic gate having first and second inputs, and further having an output, the first input coupled to the downstream tap of the shift register;
an OR logic gate having first and second inputs, and further having an output, the first input coupled to the downstream tap of the shift register;
a positive edge D flip-flop having an input coupled to the output of the AND logic gate, a true output coupled to the second input of the OR logic gate, and further having a not output coupled to the second input of the AND logic gate; and
a negative edge D flip-flop having an input coupled to the output of the OR logic gate and a true output at which the input multiplexer control signal is provided.

37. The memory device of claim 32 wherein the shift register of the synchronizer circuit comprises a plurality of series coupled positive edge D flip-flops.

38. The memory device of claim 32 wherein the clock frequency of the second clock signal is a multiple of two of the clock frequency than the first clock signal.

39. The memory device of claim 32 wherein the clock frequency of the second clock signal is four times the clock frequency of the first clock signal.

40. A processor-based system, comprising:
a processor having a processor bus;
a system controller coupled to the processor bus, the system controller having a peripheral device port, the system controller further comprising a controller coupled to a system memory port;
at least one input device coupled to the peripheral device port of the system controller;
at least one output device coupled to the peripheral device port of the system controller;
at least one data storage device coupled to the peripheral device port of the system controller;
a memory bus coupled to the system controller for transmitting memory requests and responses thereon; and
a plurality of memory modules coupled to the memory bus, each of the modules having a plurality of memory devices and a memory hub coupled to the memory devices through a memory device bus to access the memory devices, the memory hub comprising:
a clock generator coupled to the data driver to provide an internal clock signal, the clock generator comprising:
a delay circuit having input and output terminals, and further having a control terminal at which control signals are applied to set a time delay of the delay circuit; and
a synchronizer circuit having
a synchronizer input circuit having an input to which a initiation signal is applied, a clock terminal to which a first clock signal is applied, and an output at which the initiation signal is coupled in response to the first clock signal;
a shift register having an input terminal coupled to the output of the synchronizer input circuit, an output terminal, and a clock terminal to which a second clock signal is applied, the shift register shifting a logic level applied to the input terminal to the output terminal in response to the second clock signal, the shift register further having an upstream tap and a downstream tap at which the logic level propagating through the shift register is coupled at first and second times, respectively;
an input multiplexer having a first input to which the second clock signal is applied, a second input coupled to a reference voltage supply, an output coupled to the input of the delay circuit, and further having a selection terminal, the input multiplexer selectively coupling the first or second input to the output according to an input multiplexer control signal; and
an input multiplexer control circuit having an input coupled to the downstream tap, a clock terminal to which the second clock signal is applied, and further having an output coupled to the selection terminal of the input multiplexer, in response to a first logic level coupled to the downstream tap, the input multiplexer control circuit operable to generate an input multiplexer control signal to couple the second input of the input multiplexer to its output and further operable to generate a phase synchronizer signal to track the phase relationship of the second clock signal relative to a rising or falling edge of the first clock signal, in response to a second logic level coupled to the downstream tap, the input multiplexer control circuit operable to generate an input multiplexer control signal based on the synchronizer signal to couple the first input of the input multiplexer to its output at a time to provide an output clock signal having a phase relationship relative to the rising or falling edge of the first clock signal tracked by the input multiplexer control circuit.

41. The processor-based system of claim 40 wherein the synchronizer circuit of the memory hub further comprises:
an output multiplexer control circuit having a first input coupled to the upstream tap, a second input coupled to the output of the shift register, and further having an output at which an output multiplexer select signal is provided; and
an output multiplexer having a first input coupled to the output of the delay circuit, a second input coupled to the reference voltage supply, an output at which a internal clock signal is provided, and further having a selection terminal coupled to the output of the output multiplexer control circuit, the output multiplexer selectively coupling the first or second input to the output according to the output multiplexer select signal.

42. The processor-based system of claim 41 wherein the output multiplexer control circuit of the synchronizer circuit comprises an AND logic gate.

43. The processor-based system of claim 40 wherein the synchronizer input circuit of the synchronizer circuit comprises a positive edge D flip-flop.

44. The processor-based system of claim 40 wherein the clock phase tracking circuit of the synchronizer circuit comprises:

an AND logic gate having first and second inputs, and further having an output, the first input coupled to the downstream tap of the shift register;

an OR logic gate having first and second inputs, and further having an output, the first input coupled to the downstream tap of the shift register;

a positive edge D flip-flop having an input coupled to the output of the AND logic gate, a true output coupled to the second input of the OR logic gate, and further having a not output coupled to the second input of the AND logic gate; and a negative edge D flip-flop having an input coupled to the output of the OR logic gate and a true output at which the input multiplexer control signal is provided.

45. The processor-based system of claim 40 wherein the shift register of the synchronizer circuit comprises a plurality of series coupled positive edge D flip-flops.

46. The processor-based system of claim 40 wherein the clock frequency of the second clock signal is a multiple of two of the clock frequency than the first clock signal.

47. The processor-based system of claim 40 wherein the clock frequency of the second clock signal is four times the clock frequency of the first clock signal.

48. A memory hub, comprising:

a memory bus interface through which memory requests are received and memory responses are provided by the memory hub;

a local memory bus interface coupled to the memory bus interface through which memory device command, address and data signals are coupled, each signal having a timing relationship to at least one other signal;

a delay circuit coupled to the local memory bus interface to alter the timing relationship of at least one signal, the delay circuit having input and output terminals, and further having a control terminal at which control signals are applied to set a time delay of the delay circuit; and a synchronizer circuit comprising:

a synchronizer input circuit having an input to which a initiation signal is applied, a clock terminal to which a first clock signal is applied, and an output at which the initiation signal is coupled in response to the first clock signal;

a shift register having an input terminal coupled to the output of the synchronizer input circuit, an output terminal, and a clock terminal to which a second clock signal is applied, the shift register shifting a logic level applied to the input terminal to the output terminal in response to the second clock signal, the shift register further having an upstream tap and a downstream tap at which the logic level propagating through the shift register is coupled at first and second times, respectively;

an input multiplexer having a first input to which the second clock signal is applied, a second input coupled to a reference voltage supply, an output coupled to the input of the delay circuit, and further having a selection terminal, the input multiplexer selectively coupling the first or second input to the output according to an input multiplexer control signal; and an input multiplexer control circuit having an input coupled to the downstream tap, a clock terminal to which the second clock signal is applied, and further having an output coupled to the selection terminal of the input multiplexer, in response to a first logic level coupled to the downstream tap, the input multiplexer control circuit operable to generate an input multiplexer control signal to couple the second input of the input multiplexer to its output and further operable to generate a phase synchronizer signal to track the phase relationship of the second clock signal relative to a rising or falling edge of the first clock signal, in response to a second logic level coupled to the downstream tap, the input multiplexer control circuit operable to generate an input multiplexer control signal based on the synchronizer signal to couple the first input of the input multiplexer to its output at a time to provide an output clock signal having a phase relationship relative to the rising or falling edge of the first clock signal tracked by the input multiplexer control circuit.

49. The memory hub of claim 48 wherein the synchronizer circuit further comprises:

an output multiplexer control circuit having a first input coupled to the upstream tap, a second input coupled to the output of the shift register, and further having an output at which an output multiplexer select signal is provided; and an output multiplexer having a first input coupled to the output of the delay circuit, a second input coupled to the reference voltage supply, an output at which a internal clock signal is provided, and further having a selection terminal coupled to the output of the output multiplexer control circuit, the output multiplexer selectively coupling the first or second input to the output according to the output multiplexer select signal.

50. The memory hub of claim 49 wherein the output multiplexer control circuit comprises an AND logic gate.

51. The memory hub of claim 48 wherein the synchronizer input circuit of the synchronizer circuit comprises a positive edge D flip-flop.

52. The memory hub of claim 48 wherein the clock phase tracking circuit of the synchronizer circuit comprises:

an AND logic gate having first and second inputs, and further having an output, the first input coupled to the downstream tap of the shift register;

an OR logic gate having first and second inputs, and further having an output, the first input coupled to the downstream tap of the shift register;

a positive edge D flip-flop having an input coupled to the output of the AND logic gate, a true output coupled to the second input of the OR logic gate, and further having a not output coupled to the second input of the AND logic gate; and a negative edge D flip-flop having an input coupled to the output of the OR logic gate and a true output at which the input multiplexer control signal is provided.

53. The memory hub of claim 48 wherein the shift register of the synchronizer circuit comprises a plurality of series coupled positive edge D flip-flops.

54. The memory hub of claim 48 wherein the clock frequency of the second clock signal is a multiple of two of the clock frequency than the first clock signal.

55. The memory hub of claim 48 wherein the clock frequency of the second clock signal is four times the clock frequency of the first clock signal.

* * * * *